(12) United States Patent
Moribe

(10) Patent No.: US 10,664,981 B2
(45) Date of Patent: May 26, 2020

(54) DATA PROCESSING APPARATUS AND METHOD OF CONTROLLING SAME

(71) Applicant: CANON KABUSHIKI KAISHA, Tokyo (JP)

(72) Inventor: Shoei Moribe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 106 days.

(21) Appl. No.: 15/767,844

(22) PCT Filed: Nov. 11, 2016

(86) PCT No.: PCT/JP2016/083538
§ 371 (c)(1),
(2) Date: Apr. 12, 2018

(87) PCT Pub. No.: WO2017/110293
PCT Pub. Date: Jun. 29, 2017

(65) Prior Publication Data
US 2018/0315205 A1 Nov. 1, 2018

(30) Foreign Application Priority Data
Dec. 24, 2015 (JP) ................................. 2015-252404

(51) Int. Cl.
*G06K 9/00* (2006.01)
*G06T 7/521* (2017.01)
(Continued)

(52) U.S. Cl.
CPC .......... *G06T 7/521* (2017.01); *G01B 11/2504* (2013.01); *G06T 5/50* (2013.01); *G06T 2207/10028* (2013.01)

(58) Field of Classification Search
CPC ... G06T 7/521; G06T 5/50; G06T 2207/0028; G01B 11/2504; G01B 11/25;
(Continued)

(56) References Cited

U.S. PATENT DOCUMENTS 6,028,826 A * 2/2000 Yamamoto ........... G11B 7/0906
369/44.29
10,378,887 B2 * 8/2019 Na ..................... G01B 11/2536
(Continued)

FOREIGN PATENT DOCUMENTS

JP 2009-210509 A 9/2009

OTHER PUBLICATIONS

Feb. 28, 2017 International Search Report and Written Opinion in International Patent Appln. No. PCT/JP2016/083538.
(Continued)

*Primary Examiner* — Amir Alavi
(74) *Attorney, Agent, or Firm* — Venable LLP

(57) ABSTRACT

An apparatus comprises supply means for changing an amount of light sinusoidally and supplying to a projection means a patterned light signal for sequentially projecting on an object to be measured at least three patterns of patterned light having phase differences; obtainment means for obtaining image data acquired by capturing the object; first generation means for generating a phase image from image data acquired by capturing the object on which the patterned light is sequentially projected; second generation means for generating, based on the phase image, a shape image which indicates a distance between a surface of the object and a viewpoint in the capturing; and correction means for calculating an amount of correction for the shape image from a correspondence between a pixel value of a high-frequency shape image indicating a high-frequency component of the shape image and a pixel value of the phase image.

14 Claims, 11 Drawing Sheets

(51) Int. Cl.
*G01B 11/25* (2006.01)
*G06T 5/50* (2006.01)

(58) Field of Classification Search
CPC .............. G01B 11/254; G01B 11/2513; G01B 11/2509; G01B 11/2518
See application file for complete search history.

(56) References Cited

U.S. PATENT DOCUMENTS

| | | | | |
|---|---|---|---|---|
| 2006/0177747 | A1* | 8/2006 | Misaka | G03F 1/26 430/5 |
| 2006/0183031 | A1* | 8/2006 | Hwang | G03F 1/36 430/5 |
| 2007/0268490 | A1* | 11/2007 | Kawakami | G01J 4/04 356/365 |
| 2010/0330464 | A1* | 12/2010 | Kim | G03F 1/26 430/5 |
| 2017/0156605 | A1* | 6/2017 | Nakao | A61B 5/0066 |
| 2018/0137637 | A1* | 5/2018 | Cho | G06T 7/521 |
| 2018/0231372 | A1* | 8/2018 | Trail | G06T 7/521 |
| 2018/0315205 | A1* | 11/2018 | Moribe | G01B 11/2504 |

OTHER PUBLICATIONS

T. Zaman, "Development of a Topographic Imaging Device for the Near-Planar Surfaces of Paintings," Master of Science Thesis, Mechanical, Maritime, and Materials Engineering, Delft University of Technology, 2013, pp. 1-122.
S. Zhang, et al., "Phase error compensation for a 3-D shape measurement system based on the phase-shifting method," Optical Engineering, vol. 46, No. 6, Jun. 2007, pp. 063601-1-063601-9.
S. Zhang, et al., "Phase error compensation for a 3-D shape measurement system based on the phase-shifting method," Iowa State University, From the Selected Works of Song Zhang, Proceedings of SPIE, vol. 6000, Sep. 2005, pp. 60000E-1-60000E-10.
S. Zhang, et al., "Generic nonsinusoidal phase error correction for three-dimensional shape measurement using a digital video projector," Applied Optics, vol. 46, No. 1, Jan. 2007, pp. 36-43.
H. Schreiber, et al., "Phase Shifting Interferometry," Optical Shop Testing, 3rd Ed., Daniel Malacara, Ed., Jan. 1974, pp. 547-666.

* cited by examiner

GRAY CODE

BINARY CODE

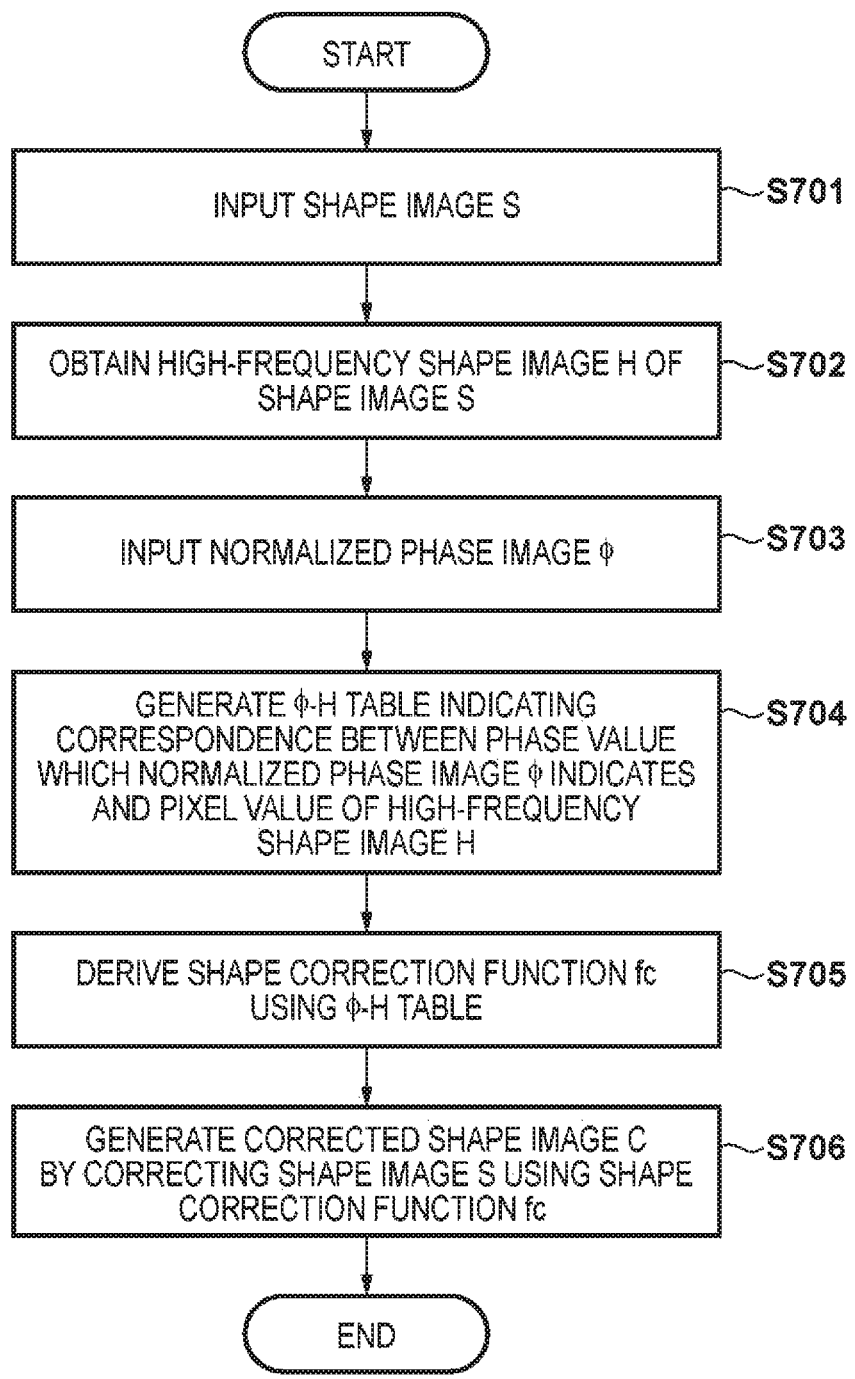

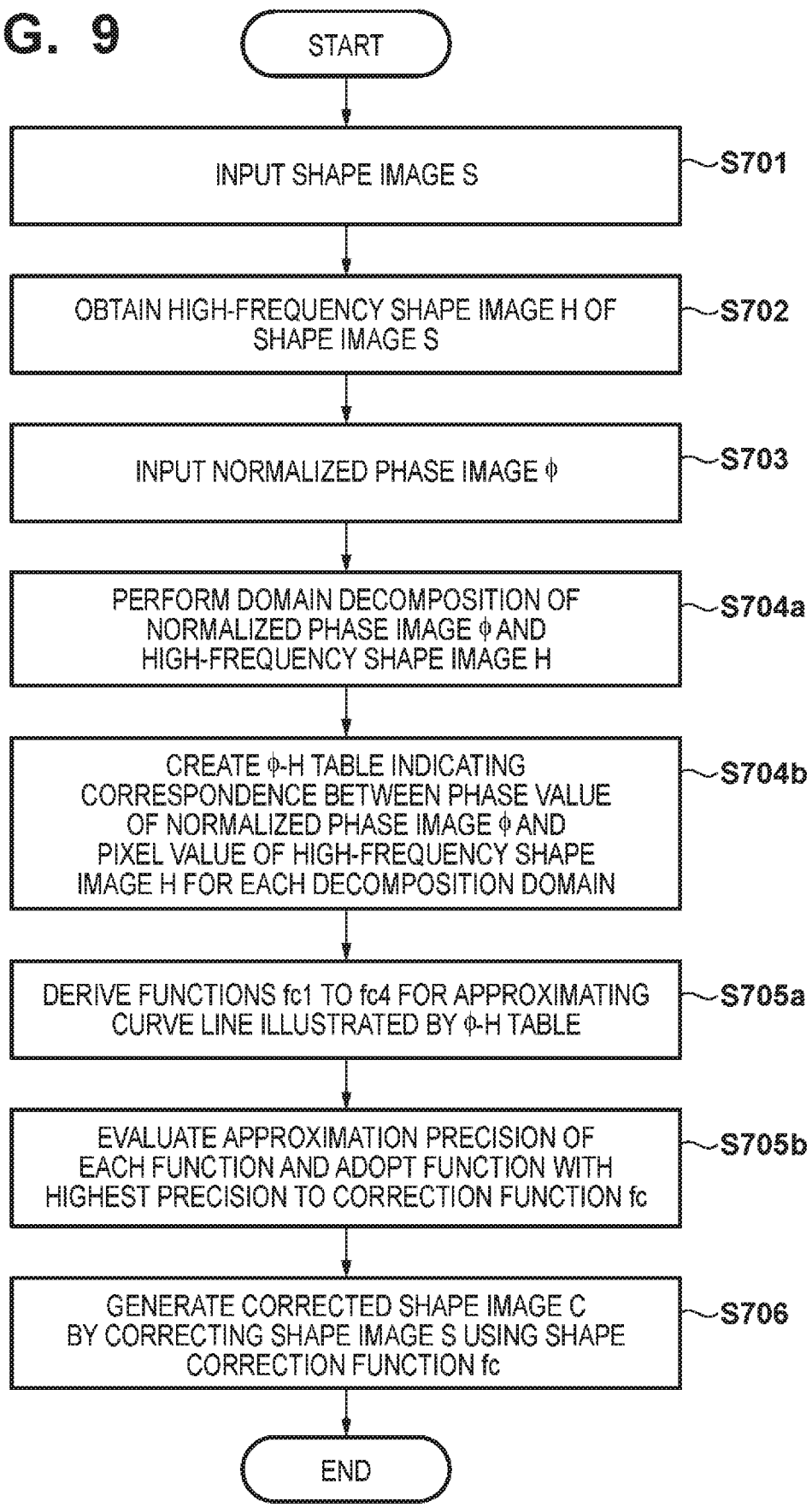

DATA PROCESSING APPARATUS AND METHOD OF CONTROLLING SAME

TECHNICAL FIELD

The present invention relates to data processing at a time at which a shape of an object is measured.

BACKGROUND ART

A method for projecting a striped pattern in which an amount of light periodically changes on an object to be measured (hereinafter referred to as a target), image-capturing the target, analyzing the striped pattern of the top of the image acquired by the capture, and measuring a three-dimensional shape of the target (a distance to the target) is known.

The measurement method called the phase shift method projects a striped pattern for which the amount of light sinusoidally changes (hereinafter referred to as a sinusoidal pattern) on a target while changing the phase a plurality of times, and captures the target. For example, it obtains three kinds of images by capturing the target after projecting a sinusoidal pattern of a phase shift of $2\pi/3$ and a sinusoidal pattern of a phase shift of $4\pi/3$ in relation to a first sinusoidal pattern. At that time, the phase of each pixel is acquired by processing for calculating, by an arc tangent, pixel values (luminance values) of the same pixel positions in each obtained image. Since the phase corresponds to a projection angle for the projector, the three-dimensional shape of the target can be measured from a triangulation method principle if the position relationship of the projector and image capturing device are known beforehand.

However, for the phase shift method, if there are nonlinearities in an output characteristic of the projector and the image capturing device, projecting/capturing a correct sinusoidal pattern is not possible and an error arises in a phase estimated for each pixel. The result of this is that a stripe error arises in the measurement results of the three-dimensional shape.

Japanese Patent Laid-Open No. 2009-210509 discloses a measurement apparatus which is not dependent on output characteristics of a projector and image capturing device by modulating/combining sinusoidal patterns. S. Zhang. P. S. Huang "Phase error compensation for a 3-D shape measurement system based on the phase-shifting method" Optical Engineering 46(6) dated June, 2007 discloses a correction table which corrects phase errors caused by nonlinearities of output characteristics of a projector and an image capturing device by using a white reference plate of uniform reflectance. Also, T. Zaman "Development of a Topographic Imaging Device" Delft University of Technology dated March, 2013 discloses a measurement method called the stereo phase shift method whose object is to perform a measurement independent of nonlinearities of output characteristics of a projector and image capturing devices by arranging two image capturing devices.

According to the techniques disclosed in the above described documents, suppressing measurement errors due to nonlinearities of output characteristics of a projector and image capturing device is possible. However, causes of an occurrence of measurement errors are not limited to just the nonlinearities of the output characteristics of the projector and the image capturing device. In particular, measurement errors arise due to light intensity fluctuations caused by a light emission timing of the projector or an image capturing timing of the image capturing device in a case when a generic projector and camera are used as the projector and the image capturing device. Regarding such fluctuation due to the emission/image capturing timing, in actuality, fluctuation at a time of measuring the target is unknown and appropriate correction is difficult even if characteristics of the measurement apparatus are obtained by using a white reference plate or the like beforehand.

SUMMARY OF INVENTION

A first embodiment of the present invention suppresses a measurement error caused by unknown light intensity fluctuations in a measurement of a shape of an object.

The first embodiment of the present invention comprises the following configuration.

A data processing apparatus, comprising: supply means for changing an amount of light sinusoidally and supplying to projection means a patterned light signal for sequentially projecting on an object to be measured at least three patterns of patterned light having phase differences; obtainment means for obtaining image data acquired by capturing the object; first generation means for generating a phase image from image data acquired by capturing the object on which the patterned light is sequentially projected; second generation means for generating, based on the phase image, a shape image which indicates a distance between a surface of the object and a viewpoint in the capturing; and correction means for calculating an amount of correction for the shape image from a correspondence between a pixel value of a high-frequency shape image indicating a high-frequency component of the shape image and a pixel value of the phase image.

By virtue of exemplary embodiments of the present invention, it is possible to suppress a measurement error caused by an unknown light intensity fluctuation by a correction based on data acquired by a measurement in an object shape measurement.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the present invention and, together with the description, serve to describe the principles of the invention.

FIG. 7A is a flowchart for describing processing of a correction unit.

FIG. 9 is a flowchart for describing processing of a correction unit of a second embodiment.

DESCRIPTION OF EMBODIMENTS

A data processing apparatus, a data processing method, and a measurement apparatus of embodiments according to the present invention will be described hereinafter in detail, with reference to the drawings. Note that these embodiments do not limit the present invention according to the scope of the claims, and not all of combinations of configurations described in the embodiments are necessarily required with respect to the problem solving means according to the present invention.

First Embodiment

Hereinafter, description will be given of an example that applies the present invention to a measurement apparatus of a stereo phase shift method which uses one projector and two image capturing devices. However, the present invention can be applied even in relation to a phase shift method which uses one image capturing device.

Apparatus Configuration

Figure 1:
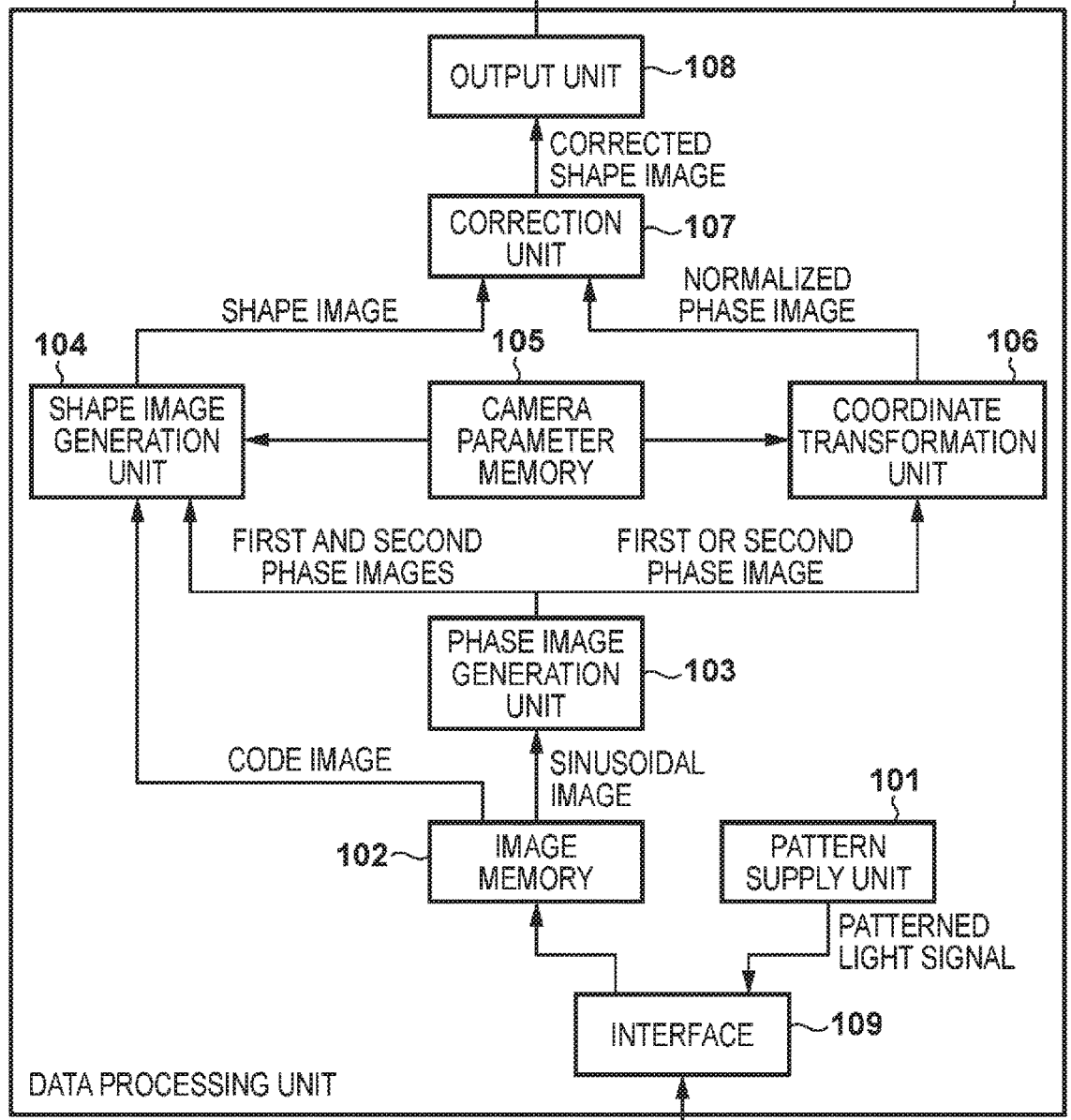
FIG. 1 is a block diagram illustrating an example configuration of an apparatus for measurement of a shape of embodiments.

An example configuration of a shape measurement apparatus of embodiments is illustrated by a block diagram of FIG. 1. The measurement apparatus comprises a projector 13 which projects a striped pattern light on an object to be measured (hereinafter referred to as a target) 12 as well as a first image capturing device 14a and a second image capturing device 14b which capture an image of the target 12 onto which the striped pattern light is projected. Also, a data processing unit 11 performs various calculations and control of the projection of the striped pattern light and capture of the measurement apparatus, and outputs shape information of the target 12 after processing the captured image data.

In the data processing unit 11, a pattern supply unit 101 generates pattern data which becomes the basis of the striped pattern light based on a pattern shape program and a program which sets a projection time or the like which are stored in a ROM, a flash memory, or the like. Alternatively, the pattern supply unit 101 may, instead of generating the pattern data, store a plurality of types of pattern data generated in advance in the ROM or the flash memory of the like and sequentially select the pattern data. In the description below, an example using three kinds of sinusoidal patterns and four kinds of code patterns as the pattern data will be described. The sinusoidal patterns are monochrome data and the amount of light in the horizontal direction periodically changes sinusoidally, and each sinusoidal pattern has a phase difference of $2\pi/3$. The details of the code patterns are described later.

The pattern supply unit 101 supplies a patterned light signal based on the pattern data generated or selected to the projector 13 via an interface 109 such as a USB interface.

The projector 13 sequentially projects the code pattern light and the sinusoidal pattern light, which are striped pattern light respectively based on the three kinds of sinusoidal pattern light signals and the four kinds of code pattern light signals, onto the target 12 at respective predetermined projection times. The first image capturing device 14a sequentially captures the target 12 on which the sinusoidal pattern light or the code pattern light is projected from a first viewpoint. The second image capturing device 14b sequentially captures the target 12 on which the sinusoidal pattern light or the code pattern light is projected from a second viewpoint. Each image capturing device performs a seven pass capture corresponding to the three kinds of sinusoidal pattern light and the four kinds of code pattern light from different viewpoints, and the captured image that the two image capturing devices 14a and 14b output is a total of 14 passes.

The image data that the image capturing devices 14a and 14b captures is temporarily stored in an image memory 102 via the interface 109. Six image data items (hereinafter referred to as sinusoidal images) of the target 12 on which the sinusoidal pattern light is projected, which are stored in the image memory 102, are output to a phase image generation unit 103. Also, eight image data items (hereinafter referred to as code images) of the target 12 on which the code pattern light is projected, which are stored in the image memory 102, are output to a shape image generation unit 104.

The phase image generation unit 103, although explained later in detail, generates a first phase image and a second phase image from the six sinusoidal images, outputs these phase images to the shape image generation unit 104, and outputs the first or second phase image to a coordinate transformation unit 106. The shape image generation unit 104, although explained later in detail, calculates a shape image of the target 12 based on the first and second phase images, the eight code images, and a camera parameter obtained from a camera parameter memory 105, and outputs the shape image to a correction unit 107. Note, the shape image is data which indicates a distance between the surface of the target 12 from the first viewpoint to each pixel for example, and there are also cases in which it is called a "range image".

The coordinate transformation unit 106 performs a coordinate transformation (rotation) such that the optical axis direction of the first or second phase image matches with the Z axis (depth direction) of world coordinates based on the camera parameter obtained from the camera parameter memory 105. The coordinate transformation unit 106 outputs the coordinate transformed phase image (hereinafter referred to as a normalized phase image) to the correction unit 107. The world coordinates are a coordinate system for the time at which the shape image generation unit 104 calculates the shape image, and the origin point of the world coordinates corresponds to the viewpoint of the shape image.

The correction unit 107, although explained later in detail, corrects the shape image based on the shape image and the normalized phase image, and outputs the corrected shape image (hereinafter referred to as a corrected shape image) to an output unit 108. The output unit 108 is for example a USB interface which outputs data of the corrected shape image to an external display apparatus or image processing apparatus.

Note, a function of the data processing unit 11 can be realized by supplying software for shape measurement to a computer device and by the computer device executing the software.

Measurement Processing

Figure 2:
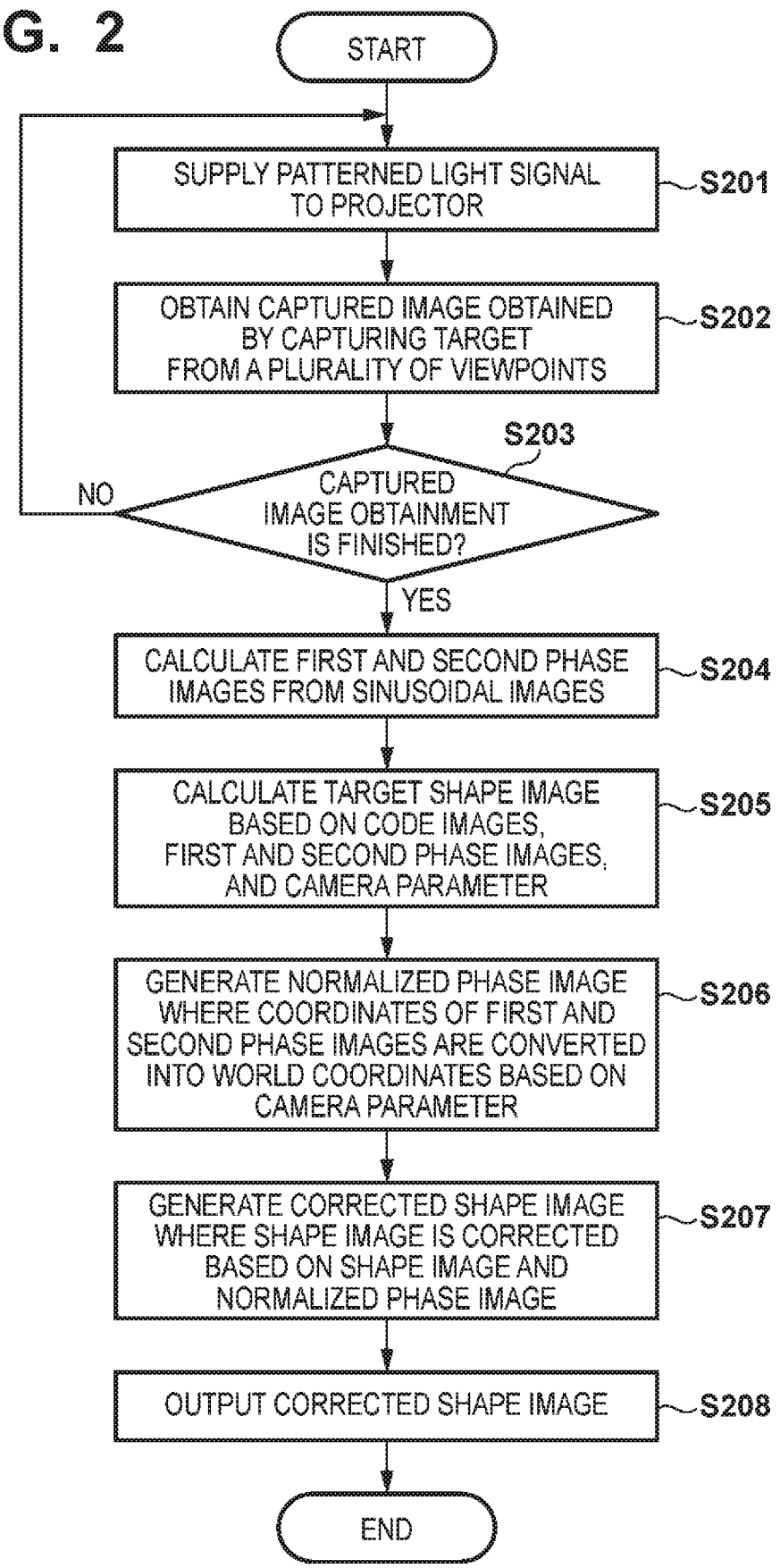
FIG. 2 is a flowchart for describing processing of a data processing unit.

Processing of the data processing unit 11 will be described by the flowchart of FIG. 2. The pattern supply unit 101 supplies a patterned light signal to the projector 13 in order to project a striped pattern light on the target 12 (step S201). The interface 109 inputs image data of the target 12 on which the striped pattern light is projected that is acquired by the capturing of the image capturing devices 14a and 14b and stores the image data to the image memory 102 (step S202). The data processing unit 11 determines whether or not obtainment of the captured image of the three kinds of sinusoidal pattern lights and the four kinds of code pattern lights (14 passes total) is finished (step S203), and in a case of incompletion, it returns the processing to step S201 and changes the striped pattern light.

When obtainment of the captured images finishes, the phase image generation unit 103 generates the first and second phase images from the sinusoidal images inputted from the image memory 102 (step S204). The shape image generation unit 104 generates the shape image of the target 12 based on the code images inputted from the image memory 102, the first and second phase images, and the camera parameter obtained from the camera parameter memory 105 (step S205).

The coordinate transformation unit 106 generates a normalized phase image for which coordinates of the first (or second) phase image are transformed from the coordinates of the first image capturing device 14a (or the second image capturing device 14b) to world coordinates (step S206) based on the camera parameter obtained from the camera parameter memory 105. The correction unit 107 generates a corrected shape image which corrects the shape image based on the shape image and the normalized phase image (step S207). The output unit 108 outputs the corrected shape image to an external display apparatus or image processing apparatus (step S208). This completes the shape measurement processing sequence.

Phase Image Generation Unit

The phase image generation unit 103 generates a first phase image from the three sinusoidal images acquired by capturing from the first viewpoint by the first image capturing device 14a and generates a second phase image from the three sinusoidal images acquired by capturing from the second viewpoint by the second image capturing device 14b.

A pixel position of the image is (x, y), and the luminance value of each pixel of the three sinusoidal images is $I1(x, y)$, $I2(x, y)$, and $I3(x, y)$. Also, for a three element vector $b=(b1, b2, b3)^T$, $b1=I1(x, y)$, $b2=I2(x, y)$, and $b3=I3(x, y)$. Here, T is a symbol which represents a transposition. Also, regarding a 3×3 matrix A, each element of the matrix A is denoted $a_{ji}$. j and i are indexes representing row and column. Here, each element of the matrix A is given as follows.

$$a_{11}=\sin(0),\ a_{12}=\sin(2\pi/3),\ a_{13}=\sin(4\pi/3)$$

$$a_{21}=\cos(0),\ a_{22}=\cos(2\pi/3),\ a_{23}=\cos(4\pi/3)$$

$$a_{31}=1, a_{32}=1, a_{33}=1$$

Next, vector $p=(p1, p2, p3)^T$ will be calculated from the following equation by using matrix A and vector b.

$$p=A^{-1}b \quad (1)$$

Here, $A^{-1}$ is an inverse matrix of A.

Then, phase $\varphi$ will be calculated from the following equation.

$$\varphi=\tan^{-1}(-p1/p2) \quad (2)$$

Here, $\tan^{-1}$ is arc tangent and $\varphi$, which satisfies $\tan\varphi=p1/p2$, is returned, the domain of $\varphi$ is $[0, 2\pi]$.

By the above described calculation, phase $\varphi(x, y)$ of each pixel is acquired and $\varphi(x, y)$ is a "phase image".

Shape Image Generation Unit

Figure 3:
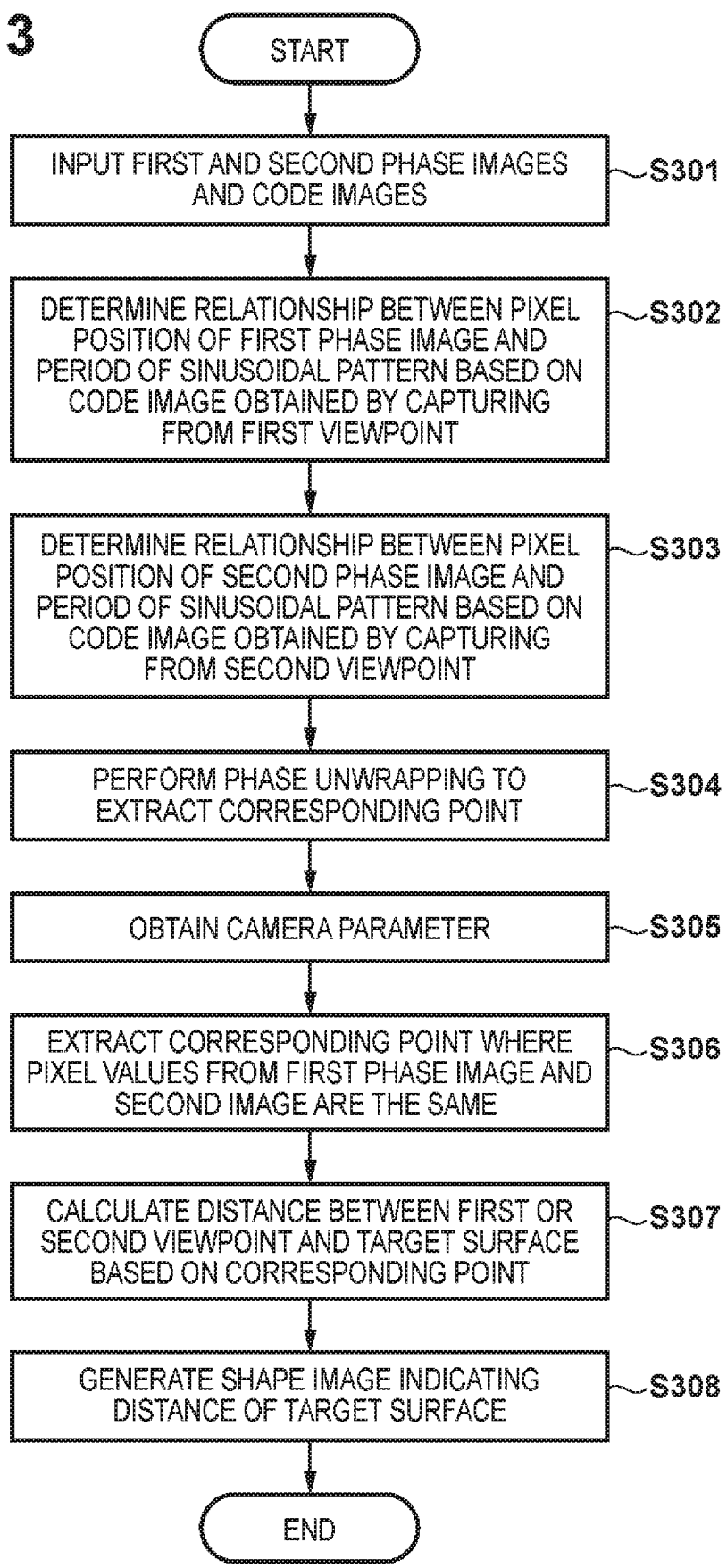
FIG. 3 is a flowchart for describing processing of a shape image generation unit.

Processing of the shape image generation unit 104 will be described by the flowchart of FIG. 3. The shape image generation unit 104 extracts a corresponding point where the pixel values from the first phase image and the second phase image are the same as each other, and generates a shape image which indicates the shape of the target 12 by calculating three-dimensional coordinates of the corresponding point by the principles of the triangulation method.

The shape image generation unit 104 inputs the first and second phase images and the code images (step S301). The shape image generation unit 104 determines a relationship between the period of the sinusoidal pattern and the pixel position (x, y) of the first phase image based on the four code images acquired by the capturing from the first viewpoint (step S302). Similarly, the shape image generation unit 104 determines a relationship between the period of the sinusoidal pattern and the pixel position (x, y) of the second phase image based on the four code images acquired by capturing from the second viewpoint (step S303). Note, the determination of the relationship between the pixel position and the period is something in which it is determined what number sinusoidal pattern period the pixel position corresponds to. Also, images for which four kinds of patterns called Gray codes are projected/captured are used as the code image.

Figure 4A:
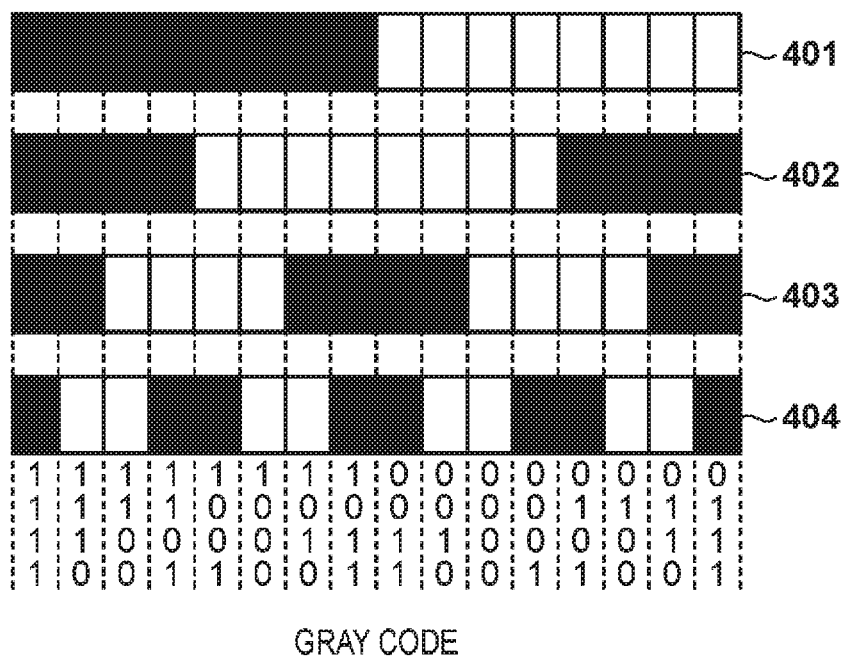
FIG. 4A is a view for illustrating an example of code images.
Figure 4B:
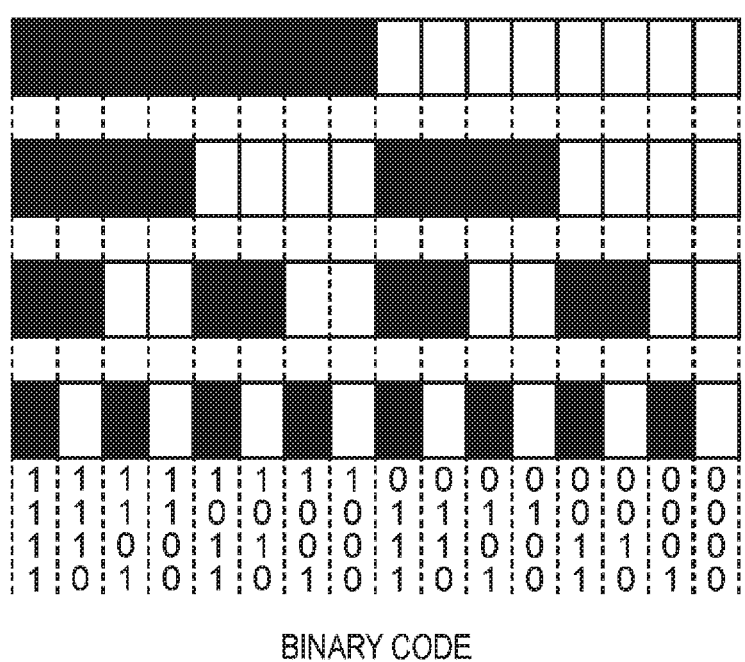
FIG. 4B is a view for illustrating an example of code images.

FIG. 4A and FIG. 4B are views for illustrating an example of code images. The Gray code illustrated in FIG. 4A is a pattern having light areas and dark areas comprising light portions and dark portions, and the light and dark regions in the horizontal direction periodically change similarly to the sinusoidal patterns. In the embodiment, light/dark patterns 401 to 404 of the four passes illustrated in FIG. 4 are used. When the dark portions (black areas) and light portions (white areas) of each image for which a pattern having light areas and dark areas is projected/captured are encoded as "1" and as "0" respectively, 4 bit binary values are acquired and 16 areas become distinguishable. Consequently, the relationship between the pixel position (x, y) and the period can be determined by causing the size of each area of the Gray code to align with one period of the sinusoidal pattern if a period M of the sinusoidal pattern is equal to or less than 16 (M<16).

An image other than the Gray codes may be used as a code image. For example, a pattern having light areas and dark areas which is called a binary pattern illustrated in FIG. 4B may be used. Also, the types of pattern are not limited to four types, and it is possible to increase or decrease the number to conform to the size or the like of the target 12.

Figure 5A:
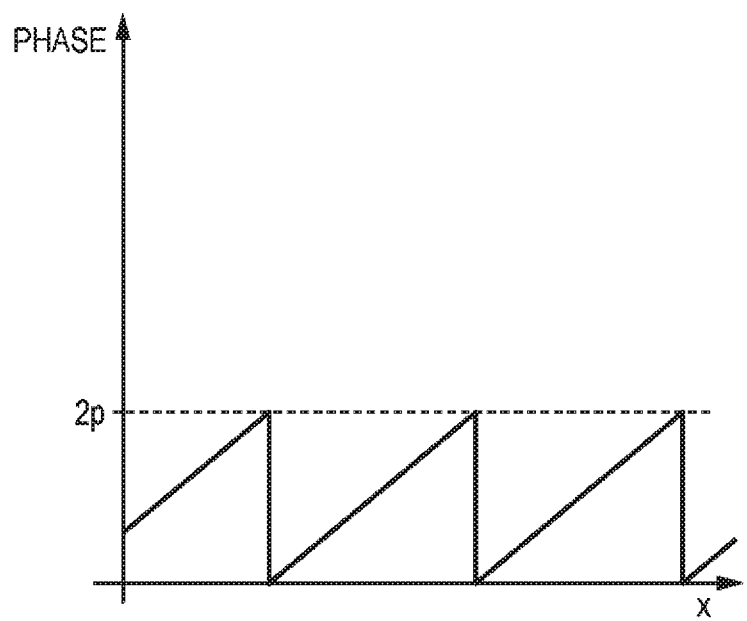
FIG. 5A is a view for describing phase unwrapping.
Figure 5B:
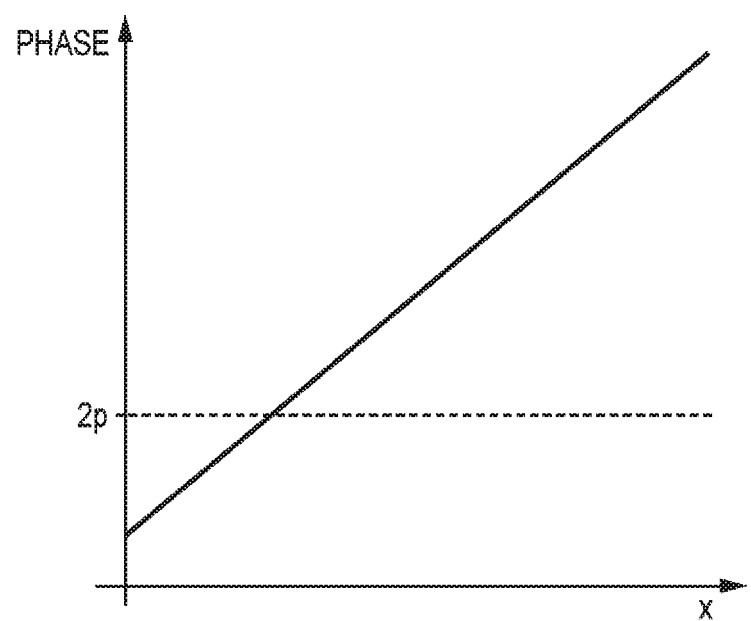
FIG. 5B is a view for describing phase unwrapping.

Next, the shape image generation unit 104 performs processing which is called "phase unwrapping" in order to extract a corresponding point where the pixel values from the first phase image and the second phase image are the same as each other based on the determination result of the relationship between the pixel position and the period (step S304). FIG. 5A and FIG. 5B are views for describing phase unwrapping processing. Because the pixel values of the phase image change periodically within the range $[0, 2\pi]$, pixels having the same pixel value (phase) appear repeatedly in a horizontal direction as illustrated in FIG. 5A, and there is not a single unique corresponding point at which pixel values are the same. The phase unwrapping processing is processing for adding $2\pi m$ to the pixel value of an m-th (m=0 to M−1) period of the phase image that an M-period sinusoidal wave includes. By phase unwrapping, the periodicity of the phase image as illustrated in FIG. 5B is removed and it becomes possible to extract a corresponding point where the pixel value (phase) is the same.

Next, the shape image generation unit 104 obtains the camera parameter from the camera parameter memory 105 (step S305). In the embodiment, a basis matrix F and perspective projection matrices $P_1$ and $P_2$ are obtained as the camera parameter. Then, the shape image generation unit 104 extracts the corresponding point where pixel values from the first phase image and the second phase image are the same as each other (step S306). The corresponding point is retrieved from the top of an epipolar line. The corresponding point can be uniquely determined even in a case when a sinusoidal pattern which changes in the horizontal direction is used by limiting a search for the corresponding point to the epipolar line. In a case in which the positions and orientations of the two image capturing devices 14a and 14b are known beforehand, the epipolar line is a constraint relating to a corresponding point when one point in a three-dimensional space is captured respectively. Note, the corresponding point may be calculated by a full search although it takes more calculation time.

Figure 6:
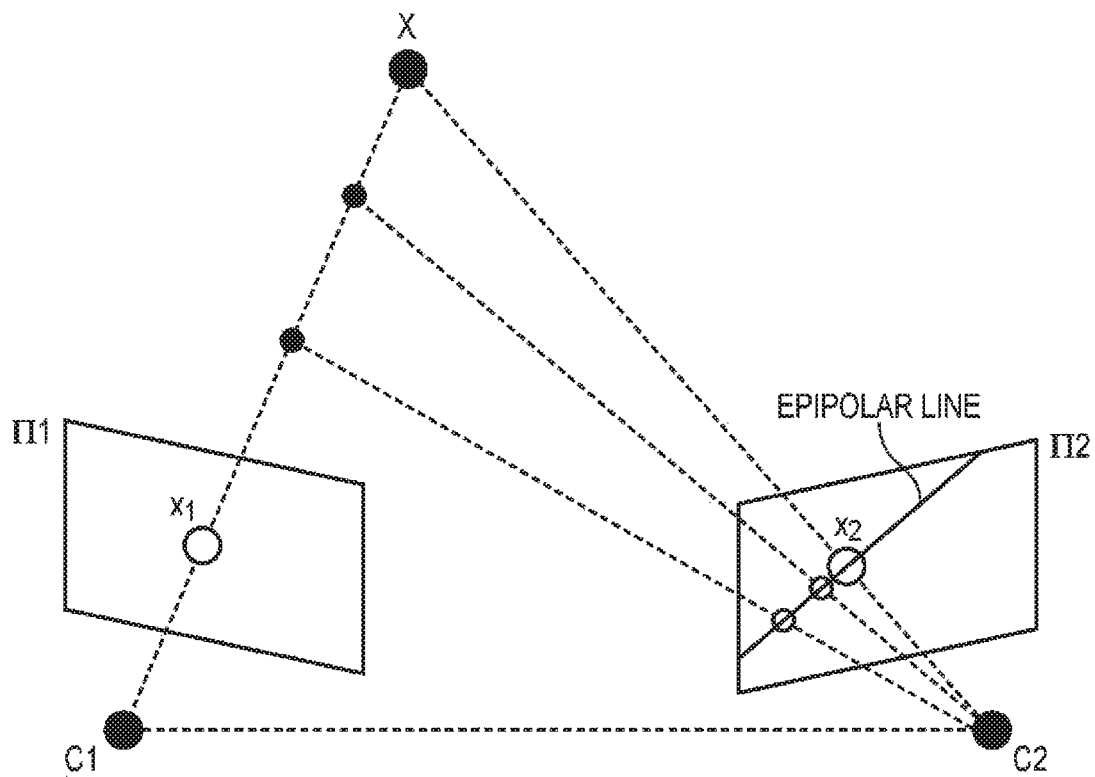
FIG. 6 is a view for describing an epipolar line.

FIG. 6 is a view for describing an epipolar line. Regarding a line segment which connects a viewpoint position C1 to a point X in three-dimensional space and a line segment which connects the viewpoint position C1 to a viewpoint position C2, a flat surface (epipolar surface) in three-dimensional space which includes the two line segments is uniquely determined. A straight line which corresponds to an intersection of the epipolar flat surface and an image capturing surface Π2 is an epipolar line. It is known that an epipolar line is represented by an equation $x_1^T F x_2 = 0$ using the basis matrix F which includes information which relates to the positions, orientations, and internal parameters of the two image capturing devices 14a and 14b. Here, $x_1$ and $x_2$ represent pixel positions in homogeneous coordinates for each camera coordinate system. For example, a corresponding point of capture point $x_1$ (corresponding to a pixel) of point X in an image capturing surface Π1 is retrieved on the epipolar line of the image capturing surface Π2 and capture points $x_1$ and $x_2$ are extracted as corresponding points in FIG. 6.

Next, the shape image generation unit 104 calculates a distance between an origin point of the world coordinates and the surface of a target 12 based on the capture points $x_1$ and $x_2$ by using the principles of the triangulation method (step S307). It is known that the distance from the origin point of the world coordinates to point X of the surface of the target 12 can be calculated from relationships of $wx_1 = P_1 X$ and $wx_2 = P_2 X$ by using the perspective projection matrices $P_1$ and $P_2$ which include information relating to the positions, orientations, and internal parameters of each image capturing device. Then, the shape image generation unit 104 generates data of the shape image which indicates the calculated distance of the surface of the target 12 (step S308).

Correction Unit

Figure 7B:
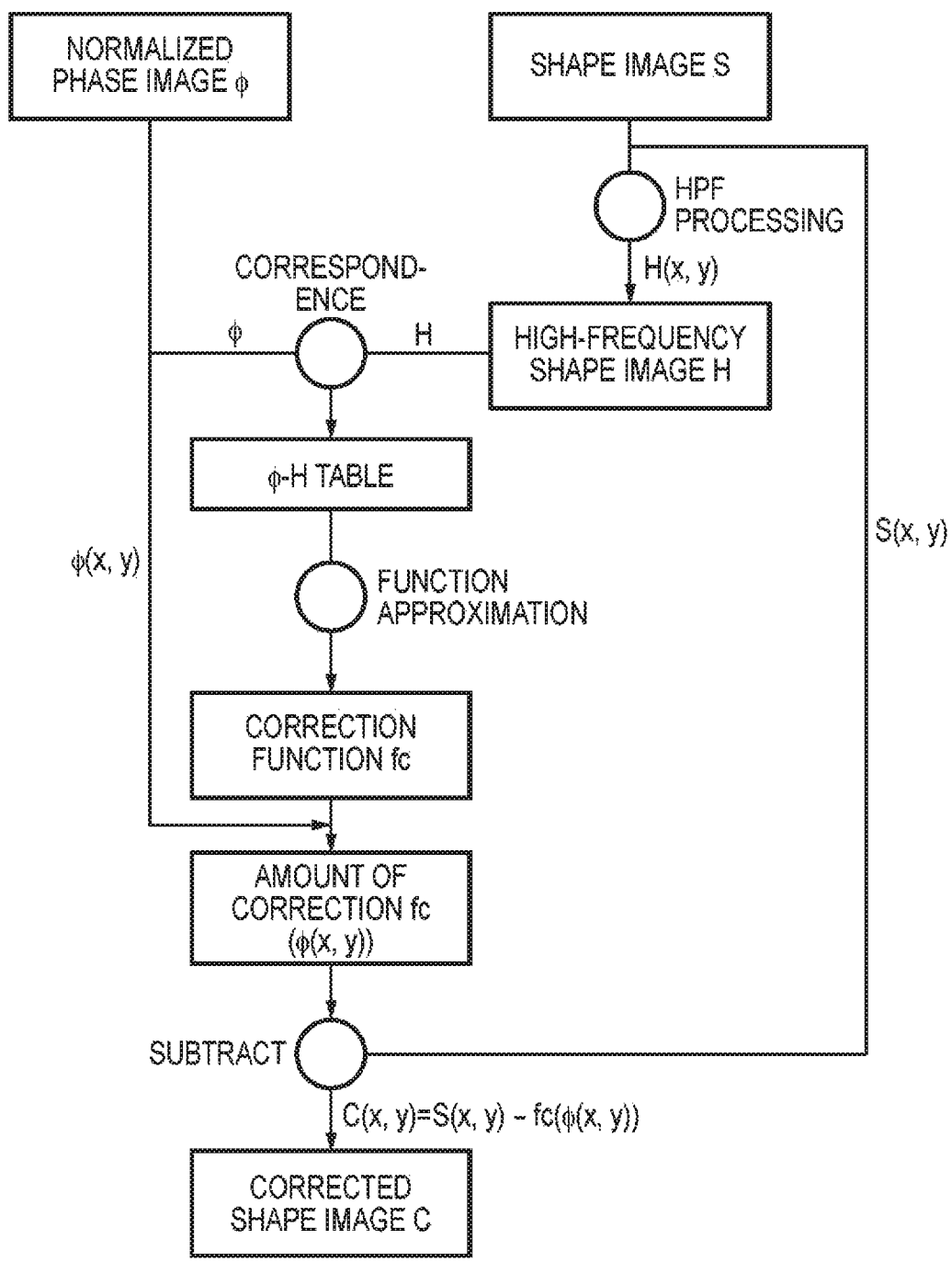
FIG. 7B is a dataflow chart illustrating a dataflow in the correction unit.

The correction unit 107 calculates a correspondence of shape and phase from the shape image and the normalized phase image, estimates an error component of the shape image based on the correspondence, and performs correction of the shape image by the error component. Processing of the correction unit 107 will be described by the flowchart of FIG. 7A. Also, a dataflow in the correction unit 107 is illustrated by a dataflow chart of FIG. 7B.

The correction unit 107 inputs the shape image S from the shape image generation unit 104 (step S701) and obtains a high-frequency component of the shape image S by high-pass filter processing (HPF processing) (step S702). In the extraction of the high-frequency component, it is necessary to extract a frequency component such that a stripe shape error component which arises in the shape image S before correction is included, although any other method may be used. Hereinafter, the high-frequency component of the shape image S is called "a high-frequency shape image H".

Next, the correction unit 107 inputs the normalized phase image q from the coordinate transformation unit 106 (step S703). The normalized phase image c is an image that is coordinate transformed (rotated) so that the optical axis direction of the first (or second) phase image and the Z axis (depth direction) of the world coordinate match. The correction unit 107 generates a φ-H table which indicates the correspondence between the phase value of the normalized phase image q and the pixel value of the high-frequency shape image H (step S704). In other words, a pixel value φ (x, y) of the normalized phase image and a pixel value H (x, y) of the high-frequency shape image are obtained for each pixel position (x, y). Then, the pixel values H corresponding to the phase values φ of the range [0, 2π] are tallied and a φ-H table (FIG. 8A) which plots an average value of the tallied pixel values H in relation to the phase value φ is generated.

Figure 8A:
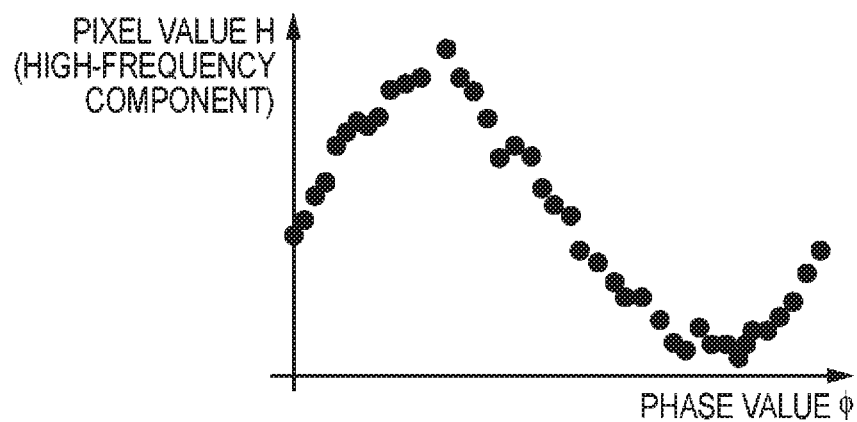
FIG. 8A is a view for describing a generation of a correction function.
Figure 8B:
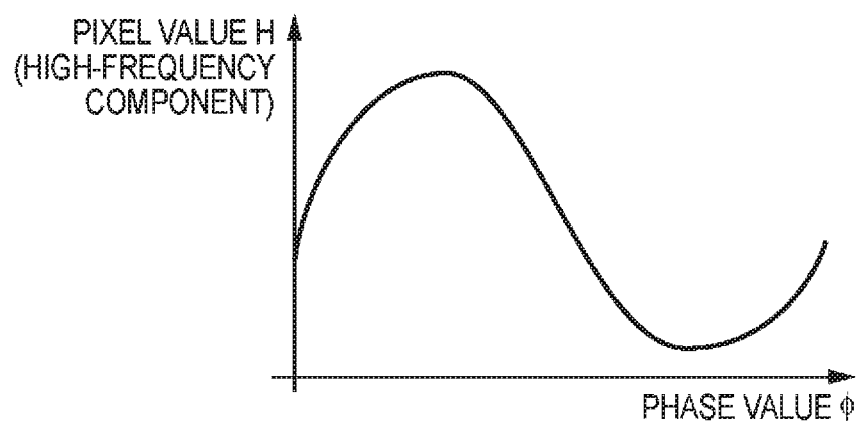
FIG. 8B is a view for describing a generation of a correction function.
Figure 8C:
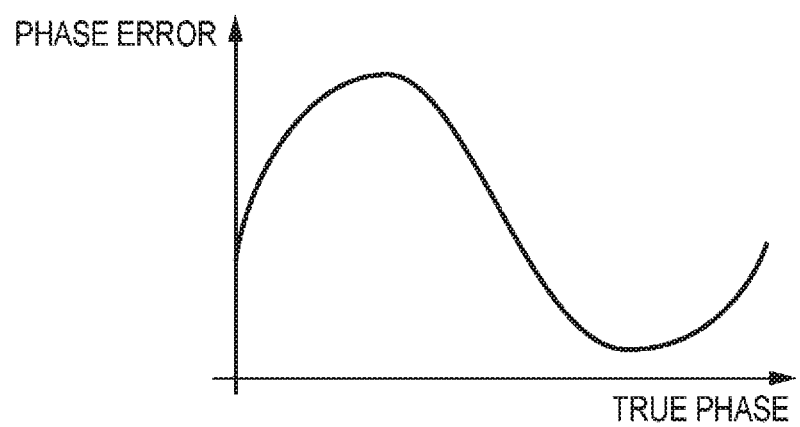
FIG. 8C is a view for describing a generation of a correction function.
Figure 10A:
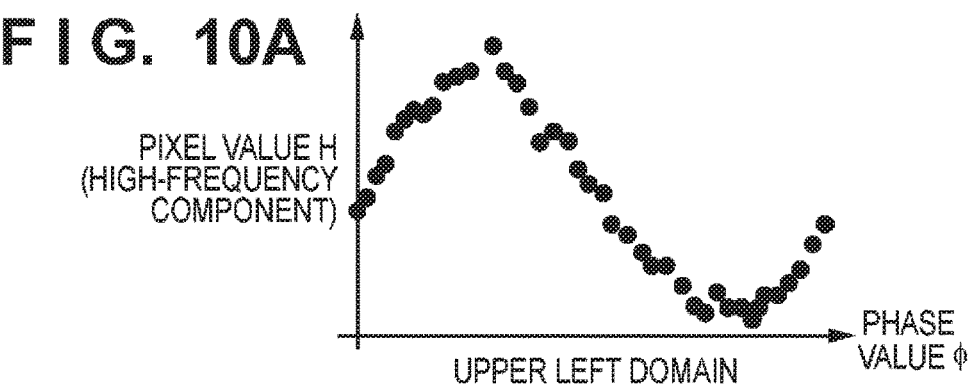
FIG. 10A is a view for illustrating examples of φ-H tables generated for four divided areas.
Figure 10B:
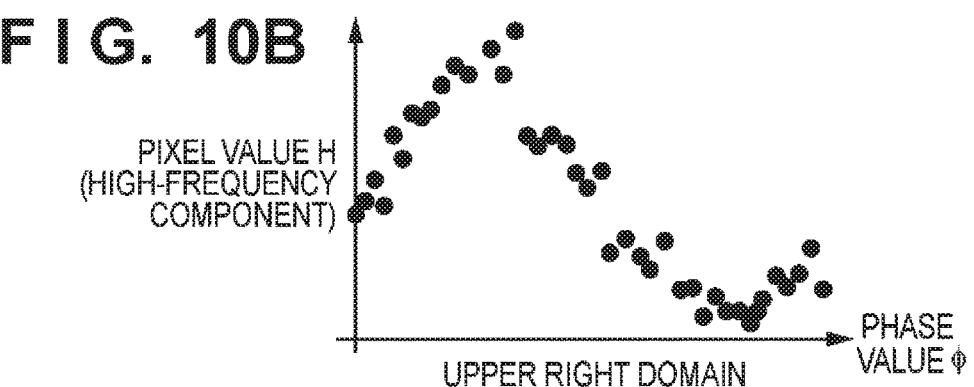
FIG. 10B is a view for illustrating examples of φ-H tables generated for four divided areas.
Figure 10C:
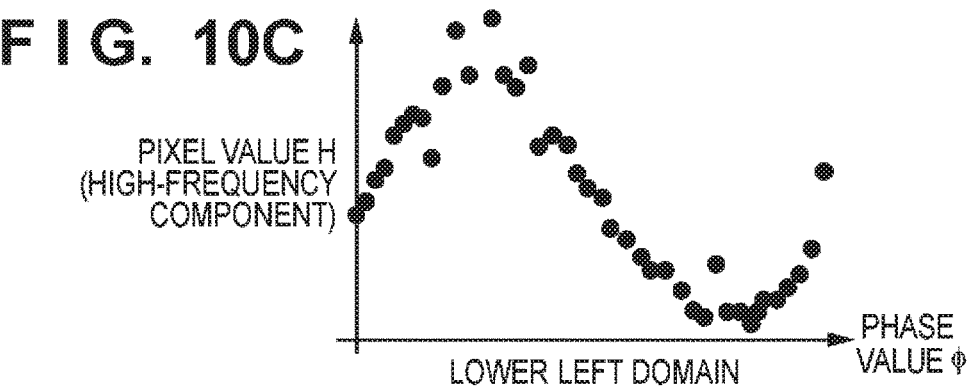
FIG. 10C is a view for illustrating examples of φ-H tables generated for four divided areas.
Figure 10D:
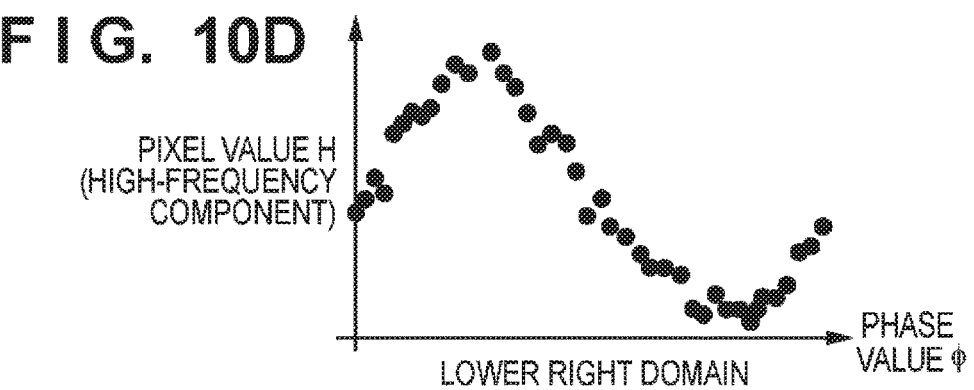
FIG. 10D is a view for illustrating examples of φ-H tables generated for four divided areas.

Next, the correction unit 107 uses the φ-H table to derive a correction function fc for the shape correction (step S705). FIG. 8A, FIG. 8B, and FIG. 8C are views for describing generation of the correction function fc. The correction unit 107 derives, as the correction function fc, a function indicated in FIG. 8B that approximates a curve that the φ-H table, which is illustrated in FIG. 8A, indicates. In the embodiment, up to the fourth-order term of a Fourier series development is used as the correction function fc. Specifically, an approximation that accords to a sinusoidal wave is performed.

Next, the correction unit 107 uses the correction function fc to calculate a corrected shape image C which corrects the shape image S (step S706). Specifically, the pixel value φ(x, y) of the normalized phase image is obtained and an amount of correction f(φ(x, y)) which corresponds to the error component according to the correction function fc is calculated for the pixel position (x, y). Then, the amount of correction f(φ(x, y)) is subtracted from the pixel value S(x, y) of the shape image and the corrected shape image C, which is expressed by the pixel value C(x, y)=S(x, y)−f(φ(x, y)), is generated.

As described above, a measurement error arises from light intensity fluctuation due to the light emission timing of the projector or the image capturing timing of the image capturing device if a generic projector and camera are used as the projector and the image capturing device in accordance with the stereo phase shift method. Regarding such fluctuation due to the emission/measurement timing, in actuality, fluctuation at a time of measuring the target is unknown and appropriate correction is difficult even if characteristics of the measurement apparatus are obtained by using a white reference plate or the like beforehand. Meanwhile, estimating an appropriate amount of correction from only the data obtained in a measurement by focusing on the relationship of a light intensity fluctuation and measurement error is possible by virtue of the shape image correction processing in the embodiment.

A sinusoidal phase error in relation to a true phase is, as illustrated in FIG. 8C, included in the phase that the phase image generation unit 103 calculated if a slight light intensity fluctuation occurs as the relationship between the light intensity fluctuation and the measurement error. A stripe shape error component occurs in the shape image S before correction due to the phase error. Regarding the sinusoidal wave, characteristics cannot be obtained beforehand because the phase or amplitude in accordance with the light intensity fluctuation is different.

Meanwhile, the high-frequency shape image H in the correction unit 107 is an image in which the stripe shape error component and the high-frequency component that the true shape has are mixed. An appropriate shape correction is something in which only the striped shape error component is removed from the shape image S while the high-frequency component that the true shape has is retained. In other words, the present embodiment focuses on the characteristics of the error illustrated in FIG. 8C, and only the stripe shape error component $f(\varphi(x, y))$ is separated by extracting components of the sinusoidal wave from the relationship of the phase and the high-frequency shape. Consequently, it is possible to acquire a post-correction shape image C in which only the stripe shape error component $f(\varphi(x, y))$ is removed while retaining the high-frequency component that the true shape has.

In this way, in an apparatus for measurement of the stereo phase shift method which uses one projector and two image capturing devices, it is possible to use only data obtained in the measurement to perform an appropriate correction in the measurement result, and suppress the measurement error even if the light intensity fluctuation in the measurement of the shape is unknown.

Variation

In the above description, although an example of a measurement apparatus which uses two image capturing devices is shown, three or more image capturing devices may be used. Also, the present invention can be applied even in relation to a phase shift method which uses one image capturing device. In this case, it is advantageous to use a technique for reducing error caused in a nonlinear output characteristic of a projector and an image capturing device that the above prior art document discloses. In other words, a correction table which corrects phase error caused by nonlinearity of output characteristics of the projector and the image capturing device by using a white reference plate of uniform reflectance is employed.

In the description above, although explanation is given of obtained information only being the shape, color information of the target 12 may also be obtained at the same time. In this case, it is advantageous for the pattern generation unit (or the pattern memory) 101 to provide a solid pattern for uniformly illuminating the target 12. Also, although three kinds of sinusoidal patterns used in the phase calculation were assumed, three or more kinds may be used. In this case, a pseudo-inverse matrix of A as matrix A−1 is used. The phase difference of each pattern is arbitrary and it is not necessary that the phase differences be uniform.

Although an example which uses the basis matrix F and the perspective projection matrices $P_1$ and $P_2$ as the camera parameter was given in the description above, the camera parameter is not limited, and may indicate the relationship of the position/orientation between cameras. Also, generating the camera parameter by measuring the shape of a known object rather than retaining the camera parameter is possible.

Also, although using a sinusoidal wave as described above as the correction function fc is ideal, an arbitrary function may be used, for example, a polynomial function may be used. Also, a Fourier series development or a polynomial order can be arbitrarily selected. Additionally, configuration may be such that a plurality of functions are used to perform the approximation and the function whose approximation precision is the best is applied to the shape correction. For example, a φ-H table approximation function square error sum can be used as the approximation precision.

Second Embodiment

Hereinafter, description of a measurement apparatus and a measurement method of a second embodiment according to the present invention is given. Note that in the second embodiment, there are cases in which the same reference numerals are added and detailed description is omitted for configurations approximately the same as those in the first embodiment.

In the first embodiment, description was given of an example in which the normalized phase image (and the high-frequency shape image H are used to generate a φ-H table of the phase value c and the pixel value H (high-frequency component) and a correction function fc is generated. However, there are cases in which the projection pattern cannot be appropriately obtained due to the brightness of the target 12 and the exposure conditions of the image capturing devices 14a and 14b, and an area in which a lot of noise is included in the obtained phase image is generated. In these cases, there is a possibility that due to an influence of the noise of the phase image and the φ-H table that is generated, it will not be possible to successfully extract the shape error component.

The correction unit 107 of the second embodiment divides an image into areas, and derives the correction function fc by using the divided area for which noise influence is considered to be the minimum. Processing of the correction unit 107 of the second embodiment by the flowchart of FIG. 9 will be described. Note, the processing in steps S701-S703 and step S706 is the same as the processing of the first embodiment illustrated in FIG. 7A and FIG. 7B, and a detailed description is omitted.

In the generation of the φ-H table, the correction unit 107 splits the normalized phase image φ and the high-frequency shape image H both vertically and horizontally for example to make four areas (an upper left area, an upper right area, a lower left area, and a lower right area) (step S704a). Then, for each divided area, the pixel value ((x, y) of the normalized phase image and the pixel value H (x, y) of the high-frequency shape image for the pixel position (x, y) are obtained and the φ-H table which maps an average value of H (x, y) for φ(x, y) is generated (step S704b). FIG. 10A, FIG. 10B, FIG. 10C, and FIG. 10D are views for illustrating examples of the φ-H tables generated for the four divided areas.

In the derivation of the correction function fc, the correction unit 107 derives (step S705a) functions fc1 to fc4 which approximate curves that the four φ-H tables illustrated in FIG. 10A, FIG. 10B, FIG. 10C, and FIG. 10D indicate, evaluates the approximation precision of each function, and the function whose the approximation precision is best is applied as the correction function fc (step S705b). For example, a φ-H table approximation function square error sum may be used as the approximation precision.

In this way, it is possible to suppress a measurement error by deriving an appropriate correction function fc even if an area which includes a large amount of noise is generated in the obtained phase image. Note, although an example in which four divided areas are made by bisecting an image both vertically and horizontally was described above, the method of area division and the number of divided areas are arbitrary, and the divided areas may overlap other divided areas. Also, the size and shape of the divided areas can be arbitrarily set and each divided area may be different.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-252404, filed Dec. 24, 2015, which is hereby incorporated by reference herein in its entirety.

The invention claimed is:

1. A data processing apparatus, comprising:
one or more processors; and
one or more memories storing instructions which, when executed by the one or more processors, cause the data processing apparatus to function as:
(1) an obtainment unit configured to obtain data representing a plurality of images each acquired by image-capturing an object onto which a pattern of patterned light, of which amount of light periodically changes along a predetermined direction, and a plurality of patterns of patterned light, which have phase differences with respect to the pattern of patterned light, are projected;
(2) a first generation unit configured to generate, based on the data representing the plurality of images, data representing a phase image in which each pixel has a phase of periodic change in pixel value between images of the plurality of images;
(3) a second generation unit configured to generate, based on the data representing the phase image, data representing a shape image in which each pixel has a value representing a shape of a surface of the object; and
(4) a correction unit configured to calculate an amount of correction for correcting the shape image based on the correspondence between a high-frequency component of a pixel value of the shape image and a pixel value of the phase image.

2. The data processing apparatus according to claim 1, wherein the correction unit is configured to obtain the high-frequency component by performing high-pass filter processing of the shape image.

3. The data processing apparatus according to claim 1, wherein the correction unit is configured to obtain a first pixel value of the phase image and a second pixel value of the a high-frequency shape image in which each pixel has the respective high-frequency component for each pixel position, tally the second pixel value corresponding to the first pixel value, and obtain, as the correspondence, a relationship between the first pixel value and an average value of the tallied second pixel value.

4. The data processing apparatus according to claim 3, wherein the correction unit is configured to derive a correction function that approximates a curve that the correspondence indicates.

5. The data processing apparatus according to claim 4, wherein the correction unit is configured to calculate the amount of correction according to a pixel value of the phase image and the correction function.

6. The data processing apparatus according to claim 3, wherein the correction unit is configured to divide the high-frequency shape image and the phase image into areas, obtain the correspondence in each divided area, derive functions that approximate curves that these correspondences indicate, and employ a function for which an approximation precision is best as a correction function.

7. The data processing apparatus according to claim 1, wherein the correction unit is configured to generate a corrected shape image resulting from subtracting the amount of correction from the shape image.

8. The data processing apparatus according to claim 1, wherein the one or more memories store instructions which, when executed by the one or more processors, cause the data processing apparatus to further function as:
a projection unit configured to project the patterned light on the object; and
an image capture unit configured to generate the data.

9. The data processing apparatus according to claim 1, wherein the amount of light in the patterned light changes sinusoidally along the predetermined direction.

10. The data processing apparatus according to claim 1, wherein the shape image indicates a distance between a surface of the object and a viewpoint in the image-capturing for obtaining the data representing the plurality of images.

11. The data processing apparatus according to claim 1, wherein the one or more memories store instructions which, when executed by the one or more processors, cause the data processing apparatus to further function as a supply unit configured to supply, to a projection unit, a signal for projecting the pattern of patterned light, of which amount of light periodically changes along the predetermined direction, and the plurality of patterns of patterned light, which have phase differences with respect to the pattern of patterned light, onto the object.

12. The data processing apparatus according to claim 1, wherein the obtainment unit is configured to obtain the data representing the plurality of images acquired by image-capturing, from each of a first viewpoint and a second viewpoint, the object onto which the pattern of patterned light, of which amount of light periodically changes along the predetermined direction, and the plurality of patterns of patterned light, which have phase differences with respect to the pattern of patterned light, are projected, wherein the first generation unit is configured to generate data representing a first phase image based on data representing a plurality of images acquired by image-capturing the object from the first viewpoint and to generate data representing a second phase image based on data representing a plurality of images acquired by image-capturing the object from the second viewpoint, wherein the second generation unit is configured to extract a correspondence point where a pixel value of the first phase image represented by the data representing the first phase image matches a pixel value of the second phase image represented by the data representing the second phase image and to generate the data representing the shape image based on the extracted correspondence point, and wherein the correction unit is configured to calculate the amount of correction for correcting the shape image based on the correspondence between a high-frequency component of a pixel value of the shape image and a pixel value of the first phase image or the second phase image.

13. A method of processing data, the method comprising:

obtaining data representing a plurality of images each acquired by image-capturing an object onto which a pattern of patterned light, of which amount of light periodically changes along a predetermined direction, and a plurality of patterns of patterned light, which have phase differences with respect to the pattern of patterned light, are projected;

generating, based on the data representing the plurality of images, data representing a phase image in which each pixel has a phase of periodic change in pixel value between images of the plurality of images;

generating, based on the data representing the phase image, data representing a shape image in which each pixel has a value representing a shape of a surface of the object; and calculating an amount of correction for correcting the shape image based on the correspondence between a high-frequency component of a pixel value of the shape image and a pixel value of the phase image.

14. A non-transitory computer-readable storage medium storing a computer program that realizes on a computer:

an obtainment function of obtaining data representing a plurality of images each acquired by image-capturing an object onto which a pattern of patterned light, of which amount of light periodically changes along a predetermined direction, and a plurality of patterns of patterned light, which have phase differences with respect to the pattern of patterned light, are projected;

a first generation function of generating, based on the data representing the plurality of images, data representing a phase image in which each pixel has a phase of periodic change in pixel value between images of the plurality of images;

a second generation function of generating, based on the data representing the phase image, data representing a shape image in which each pixel has a value representing a shape of a surface of the object; and a correction function of calculating an amount of correction for correcting the shape image based on the correspondence between a high-frequency component of a pixel value of the shape image and a pixel value of the phase image.

* * * * *